United States Patent Office 3,455,147
Patented July 15, 1969

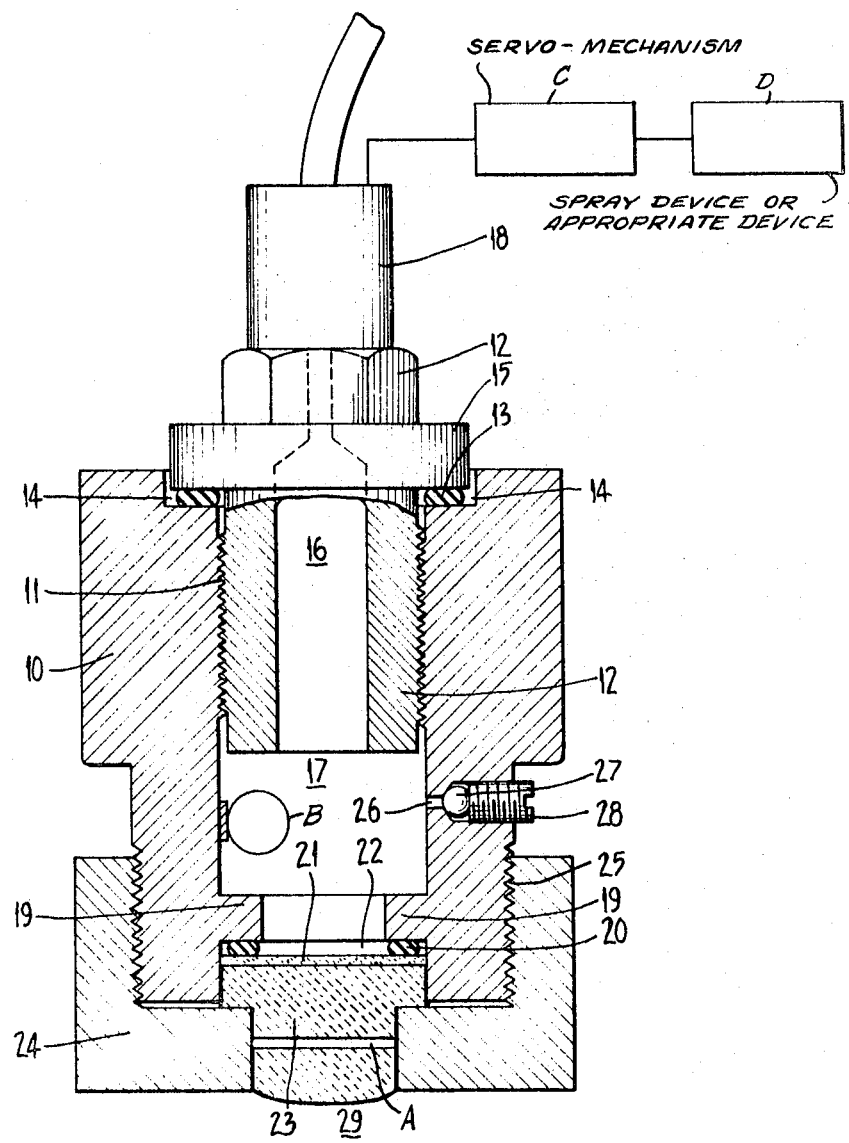

3,455,147
METHOD AND MEANS FOR MEASURING THE
FREE ENERGY OF SOLVENTS
Adrian J. Peck, Hughes, Australian Capital Territory, and
Ralph M. Rabbidge, Campbell, Australian Capital Territory, Australia, assignors to Commonwealth Scientific
and Industrial Research Organization, East Melbourne,
Victoria, Australia, a body corporate of Australia
Filed Nov. 18, 1966, Ser. No. 595,505
Claims priority, application Australia, Nov. 23, 1965,
66,913/65
Int. Cl. G01n 11/02
U.S. Cl. 73—64.3                                  10 Claims

ABSTRACT OF THE DISCLOSURE

A measuring instrument including a solution enclosure having a solvent permeable and solute impermeable membrane as one of its boundary walls, where the membrane is supported by a porous pad. A sensing means communicates with the solution chamber to sense and indicate changes in pressure within the chamber when the instrument is placed in the testing environment. A solution comprising a solvent and solute are placed within the chamber of the instrument and the instrument is placed in the testing environment. The solvent flows across the membrane and porous pad due to a difference in the free energy of the solvent molecules inside and outside of the container causing a movement of the solvent molecules through the semipermeable membrane and its porous support. The flow of the solvent molecules across the semipermeable membrane activates the sensing means which indicates a changing in the pressure in the solution chamber.

---

This invention relates to methods of, and means for, measuring the free energy of solvents in particular locations.

The free energy of a solvent molecule is determined by the forces acting on that molecule. These forces arise from temperature, pressure, the presence of solute molecules in the solvent, the proximity of solid surfaces and the nature of such surfaces, gravity and other, less important reasons.

Free energy, as far as necessary for the purposes of this specification, is defined as the quantity of work which must be done in transferring a unit quanity of the solvent (either mass or volume) from a reference state to the place where it is located under the conditions prevailing there. The most usual reference state is that of pure, free solvent at atmospheric pressure at the same elevation and temperature as the place where the free energy measurement is to be taken.

In particular, the invention refers to the free energy of water, which is the most common of solvents, in porous media such as soils. It is in this respect that the method and means of this invention are expected to find extensive and varied practical applications in agriculture, horticulture and studies of soil-water interactions generally. For ease and brevity of the ensuing description, reference will henceforth be made to water in soils for the greater part, but it should be clearly understood that the invention is not to be construed as limited in this way, as it is equally applicable to and useable with other solvents in other situations.

The free energy of water in a soil is usually referred to as the "water potential" and expressed in units of pressure such as atmospheres, centimetres of water or centimetres of mercury. In this specification any necessary quantitative values of water potential will be given in atmospheres.

It is at present known that, in the absence of salts in the soil-water medium, the water potential in a soil may be measured by a device which is essentially a manometer, modified to prevent air from entering the tube system when it is placed in contact with a medium such as a soil, which is not necessarily completely saturated with water. The disadvantage of such a device is that it fails completely to give any measure of water potentials less than about minus 0.8 atmosphere, because at lower potentials water in the manometer vapourizes and the manometer becomes inoperative. On the other hand, it is known that plants are able to extract water from soils with water potentials as low as minus 15 atmospheres.

Other devices are known for indicating water potentials at values below minus 1 atmosphere. The majority of such devices operate on the basis of indirect effects, for example, the electric or electrostatic properties of a porous block which is in hydraulic contact with the soil. These instruments have been found to suffer considerably from hysteresis effects which render their accuracy questionable.

It is an object of this invention to provide an improved device for measuring solvent potentials. Another object is to provide, for measuring water potentials, a device which is free from the disadvantages mentioned above and is capable of functioning at values of water potential considerably below those at which presently known accurate devices of this type are adapted to work. Other aims and objects of the invention will become apparent from the ensuing description.

According to the invention there is provided, for measuring the free energy of a solvent at a given locality in an environment, an instrument which comprises an enclosure filled with a standard solution of the solvent, the enclosure being defined by a boundary wall at least a portion of which is constituted by a membrane which is permeable to the solvent but is impermeable to the solute molecules of the standard solution, and means for quantitatively sensing pressure changes in the standard solution brought about by the environment. Preferably the instrument also includes a porous support for the semipermeable membrane, disposed outside the enclosure and extending over the area of the membrane.

The invention also includes a method for determining the free energy of a solvent at a particular location in an environment which comprises the steps of depressing the free energy of a reference sample of a solvent to a value below that at the location where the determination is to take place, and measuring the positive pressure change required to equilibrate the free energy of the reference sample with that in the environment at said location. According to one aspect of the invention the free energy of the reference sample is depressed by means of osmotic forces. According to another aspect the free energy is depressed by adsorptive forces.

The novel method of free energy determination of this invention is based on the known physical effect that the free energy of a solvent, at a particular temperature and pressure, is less if a solute is present in the solvent, than it would be if the solvent were pure. Thus the free energy of water in an aqueous solution is lower than that of pure water under the same conditions, but by the application of pressure to the solution the free energy of water can be restored to its value in the pure state. The pressure required to effect restoration is defined as the osmotic pressure of the solution. If a pressure less than the osmotic pressure is applied, the free energy of the water is increased to a value intermediate between that in the solution and that of pure water.

Thus the addition of a solute provides a convenient means of depressing the free energy of water below a standard reference level, and with sufficient depression the free energy of water in an aqueous solution can be made less than that in a particular environment. Accordingly, a "standard solution of the solvent" as used above is a solution containing a suitable solute dissolved in the solvent. The quantity of the solute dissolved is so chosen as to depress the free energy of the solvent to a reference level, which determines the range of free energy values capable of being measured by the device; and the predetermined reference level is accordingly selected depending on the application to which the device is to be put.

A presently preferred embodiment of the invention will now be described in detail, by way of example, with reference to the accompanying drawing, which is a schematic cross-sectional view of an instrument designed for determining the free energy of water in particular locations in any given environment.

As can be seen from the drawing the instrument comprises a generally cylindrical, open-ended, rigid container 10 which is internally screw-threaded for a portion of its length at 11. One end of the container 10 is closed by an externally screw-threaded plug 12, which engages the threaded portion 11 of the container, and is sealed against it by means of an O-ring seal 13. The seal 13 is located in an annular recess 14 at the said one end of the container, and is engaged by an outwardly projecting annular shoulder 15 on the plug. An axial bore 16 extends right through the plug 12, by means of which the interior 17 of the container 10 is brought into direct communication with a conventional strain gauge pressure transducer 18, which is mounted on or fixedly attached to the plug 12.

At the other end the container 10 is provided with an inwardly projecting annular ledge 19, on the outer surface of which a further O-ring seal 20 is positioned. The seal 20 is engaged by a membrane 21, which extends across the entire open end 22 of the container. The membrane 21 is supported by a pad or disc 23 of porous ceramic material, and both are held in position across the open end 22 of the container 10 by means of a screw-threaded locking cap 24, which engages an externally screw-threaded portion 25 at this end of the container.

The interior 17 of the container is filled with an aqueous solution of polyethylene glycol of molecular weight of about 20,000. In the central portion of the container there is a transverse bore 26, which is closed by a ball-valve 27. This valve is operated by a set-screw 28, which can be turned from outside the container to release the valve and allow some of the solution to escape. This adjustable valve serves primarily for the filling, calibration of the instrument and the checking of its zero setting, apart from its inherent function as a pressure release valve. The membrane 21 is made from "Visking" dialysis tubing, of a thickness of $5 \times 10^{-3}$ cm., and its porous support pad 23 is made of a ceramic material of the type normally used in pressure plate apparatus.

In operation, the instrument described above is placed in the position where the solvent potential is to be measured. In the case of water potential in the soil, this could, for example, be at a given depth below the ground. Preferably, the medium 29 of the environment comes into contact with the support pad 23, which may be in the domed shape shown in the drawing, in order to offer a greater surface contact area to the medium.

The principle of operation of the instrument is based on the fact that any difference in free energy of the solvent molecules inside the container and that of similar molecules in the surrounding environment will give rise to a movement of solvent molecules through the semi-permeable membrane 21 and its porous support 23 until an equilibrium state is reached, when the free energy of the solvent molecules is the same both inside and outside the container. The arrangement is such that the quantity of solvent interchanged is relatively very small in comparison with the volume of the standard solution, so that there is a negligible change of solute concentration within the container or enclosure, and the greater part of the change in the free energy of the solvent molecules is brought about by a change of pressure in the enclosure. This pressure change, which is measured by the strain gauge transducer 18, provides an indication of the free energy of the solvent molecules in the environment relative to the known free energy level inside the instrument. By suitable calibration the instrument may be made direct-reading in terms of free energy values, expressed in units of pressure. Alternatively in one possible practical application of the invention, the transducer may provide a source of energy to a servomechanism C or like device which, after electrical or hydraulic amplification, may be arranged to operate, for example, a spray irrigation plant D or the like, bringing it into operation to restore the water potential in the particular soil to a predetermined acceptable level. The servomechanism and controlled spray arrangement are generally indicated by block diagrams and it would, of course, be obvious to substitute equivalent structure for these indicated devices.

For efficient operation of the instrument, and in particular for the purpose of giving accurate readings as quickly as possible after any conditions in the environment have changed, it is desirable that the time constant of operation be kept as small as possible. This time constant is directly related to the resistance to solvent flow offered by the semipermeable membrane and its porous support, as well as the volume of solvent which must pass through the membrane and its support in order to give rise to unit pressure change within the enclosure. For accurate, efficient and speedy operation therefore both the flow resistance of the membrane and its support, and the volume of solvent necessary to bring about the said unit pressure change should be kept as small as possible. Similarly, in order that the volume compressibility of the solution inside the enclosure does not contribute significantly to the volume of solvent necessary to bring about said unit pressure change, it is desirable that the volume of the enclosure should be as small as practicable.

The porous support pad 23 of the instrument is really necessary only for the purpose of minimising volume distortion of the enclosure and preventing the membrane from being destroyed by the pressures developed within the enclosure. Many porous materials are accordingly adequate for this purpose. It is, however, generally desirable to have a quite finely porous support pad for measuring the water potentials in a soil, in order that the transfer of water in the pad shall be predominantly in the liquid phase over the range of water potentials that the instrument is designed to measure. Another desirable feature of a finely porous support pad is that it prevents the soil microbes from attacking the membrane.

In cases where the free energy of a solvent is to be measured in the presence of solute molecules in the environment, for example, in a soil with appreciable quantities of dissolved salts in its contained water, a vapour gap A is provided in the porous support pad according to a modification of the invention. This vapour gap constitutes an additional barrier to the entrance of the salt or other impurity molecules into the enclosure through the membrane. This does not mean that the instrument without such an air gap cannot be used in soils containing dissolved salts. In such cases, however, it is not the free energy of soil water, or water potential which is detected, but rather what is commonly known as the capillary or matric potential. This is defined as the work which must be done in transferring a unit quantity (either mass or volume) of the soil solution from a reference state to the place where measurement is made and under the conditions prevailing there. In this case the reference state is a pool of free soil solution at atmospheric pressure and the same elevation and temperature as the place where the measurement is taken.

The concentration of the standard solution determines the lower limit of free energy levels which may be measured with the instrument, as previously mentioned, for if the free energy of the solvent in the environment is less than that in the enclosure even when the pressure therein is approaching its absolute zero, further movement of solvent out of the enclosure can result in the formation of vapour bubbles in the standard solution and possibly the separation of the semipermeable membrane from its support pad, which would lead to its ultimate rupture. Apart from polyethylene glycol, other high molecular weight substances should also be suitable as solutes for use in the instrument.

The choice of the material for the semipermeable membrane is related to the solute chosen for the standard solution, because the membrane must, as far as possible, be impermeable to the solute. Normal cellophane has been found to be quite satisfactory in use with the solutes mentioned as well as several types of plastic sheeting, in addition to the dialysis tubing already mentioned.

There are no particular criteria for the quantitative pressure sensing means, and many pressure detectors, transducers and like instruments available on the market would be satisfactory. For greater sensitivity and rapid response, of course, it is desirable that the detector chosen should have the greatest possible resolution, while at the same time requiring a minimum volume change to bring about unit indication of such pressure change. This latter desideratum can be concisely defined by stating that the pressure transducer should extract as little energy as possible from the system.

Tests of the operation of the method and instrument described for measuring the free energy of solvents, in particular water in soils, have been made. Samples of soil were dried out to water potentials of minus 1.25 and minus 2.75 atmospheres in a pressure membrane apparatus. The samples were removed from the pressure membrane apparatus and, before significant quantities of water could be lost or gained by the sample, a measurement of the water potential was made using an instrument constructed in the manner described in this specification. The measured water potentials were within 5% of the known values imposed on the soil samples. These results are considered to be eminently satisfactory, as such small difference could perhaps have arisen, at least in part, from known inadequacies in the functioning of the pressure membrane apparatus itself.

Apart from the advantages of quick operation and large operating range, the new instrument also possesses a significant advantage as far as ease of calibration is concerned. This is done simply by dipping the instrument into free-standing pure solvent at the temperature at which the readings are to be taken, to indicate what is, by definition, the zero for free energy measurement. The free energy of the solvent at other localities is then found, in units of pressure, from the change in indication of the pressure detector as already described. For example, if the pressure reading is 15 atmospheres in free solvent and 5 atmospheres at some other location, the free energy of the solvent at that location would be minus 10 atmospheres.

The effects of temperature, which affect the free energy of the solvent in the standard solution, can be largely compensated for by a temperature compensating means B placed within the enclosure containing the standard solution. The temperature compensating means could take the form of a suitable quantity of an inert solid substance, such as a glass, with an appropriate coefficient of thermal expansion. Also, some temperature compensation can be achieved in the external circuitry of the pressure transducer, such as by use of temperature dependent resistors.

Apart from the utilization of osmotic forces, i.e., the addition of a solute to the solvent in the enclosure of the instrument, for the purpose of depressing the free energy of the reference sample of the solvent, the invention may also lend itself to the employment of adsorptive forces to bring about the same result. This could be achieved, for example, by the emplacement of a water-saturated clay, or a gel, in the enclosure of the instrument. These and other modifications and variations in the instrument and method described herein are accordingly to be construed as being within the spirit and scope of the invention, which is not to be regarded as being limited to the specific construction described and shown in the drawing.

We claim:

1. An instrument for measuring the free energy of a solvent at a given locality in an environment, said instrument comprising an enclosure, boundary walls defining the confines of the enclosure, a portion of said boundary walls being constituted by a membrane which is permeable to the solvent but is impermeable to the molecules of a solute, said enclosure being filled with a solution of said solute in the solvent; and means for quantitatively sensing and indicating pressure changes in said solution due to the presence of the solvent in the environment.

2. An instrument for measuring the free energy of a solvent at a given locality in an environment, said instrument comprising an enclosure, boundary walls defining the confines of the enclosure, a portion of said boundary walls being constituted by a membrane which is permeable to the solvent but is impermeable to the molecules of a solute, a porous support for the membrane; said support being in the form of a pad of a finely porous material, such that transfer of said solvent through the material takes place predominantly in the liquid phase, said pad being located outside the enclosure, and extending over the portion of the boundary walls constituted by said membrane, said enclosure being filled with a solution of said solute in the solvent; and means for quantitatively sensing and indicating pressure changes in said solution due to the presence of the solvent in the environment.

3. An instrument according to claim 2, wherein said porous support pad includes a vapour gap therein, constituting a barrier to the passage of impurity particles with the solvent from the environment towards the membrane.

4. An instrument for measuring the free energy of a solvent at a given locality in an environment, said instrument comprising an enclosure, boundary walls defining the confines of the enclosure, and an adjustable outlet valve for the enclosure; a portion of said boundary walls being constituted by a membrane which is permeable to the solvent but is impermeable to the molecules of a solute, said enclosure being filled with a solution of said solute in the solvent, and including means for compensating the effects of temperature changes on the free energy of the solvent in said solution; a finely porous support pad for the membrane, said pad being made of a material such that transfer of said solvent therethrough takes place predominantly in the liquid phase, said pad being located outside the enclosure, and extending over the entire area of the membrane; means for quantitively sensing pressure changes in said solution due to the presence of the solvent in the environment, and means for transducing the sensed pressure changes into electrical quantities.

5. An instrument according to claim 4, wherein said means for compensating the effects of temperature changes includes a body of glass within the enclosure, said glass having a coefficient of thermal expansion appropriate to the solution.

6. An instrument for measuring the free energy of water at a given locality in the soil, said instrument comprising an enclosure, boundary walls defining the enclosure, and an adjustable calibration and outlet valve for the enclosure; a portion of said boundary walls being constituted by a membrane of a cellulose derivative material, said membrane being permeable to water but impermeable to the molecules of a high molecular weight solute, said enclosure being filled with a solution of said solute in water, the volume of the solution in the enclosure being such that the quantity of water interchanged with the soil through the membrane is minute relative to the total volume of the solution, and means being provided for compensating the effects of temperature changes on the free energy of water in said solution; a finely porous support pad for the membrane, said pad being made of a material such that transfer of water therethrough takes place predominantly in the liquid phase, said pad being located outside the enclosure and extending over the entire area of the membrane in such a way that, in use, the pad comes into contact with the soil; and pressure transducer means for quantitatively sensing pressure changes in said solution due to the presence of water in the soil, and transducing the sensed pressure changes into electrical quantities.

7. An instrument according to claim 6, wherein there is provided means for the pressure transducer to actuate a servomechanism, whereby said servomechanism is operated whenever the water potential in the soil has fallen below a predetermined value, and means actuated by said servomechanism for restoring the water potential to said predetermined level.

8. A method for determining the free energy of a solvent at a particular location in an environment, which comprises the steps of depressing the free energy of a reference sample of the solvent to a value below that at the location where the determination is to take place, and measuring the positive pressure change required to equilibrate the free energy of the reference sample with that in the environment.

9. A method according to claim 8, wherein the free energy of the reference sample is depressed by osmotic forces generated by the addition of a solute thereto.

10. A method according to claim 8, wherein the free energy of the reference sample is depressed by adsorptive forces generated by the insertion of an adsorptive substance into the reference sample.

References Cited

UNITED STATES PATENTS

| | | | |
|---|---|---|---|
| 3,063,288 | 11/1962 | Reiff | 73—64.3 |
| 3,187,562 | 6/1965 | Rolfson | 73—64.3 |

LOUIS R. PRINCE, Primary Examiner

U.S. Cl. X.R.

73—38